Dec. 23, 1941.  E. O. HASKINS  2,266,969

TRACTOR WHEEL

Filed Oct. 25, 1940  2 Sheets-Sheet 1

INVENTOR.
EARL O. HASKINS
BY U. S. Charles

Dec. 23, 1941.   E. O. HASKINS   2,266,969
TRACTOR WHEEL
Filed Oct. 25, 1940   2 Sheets-Sheet 2
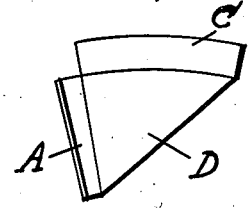
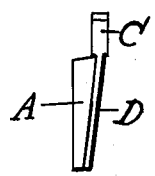
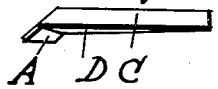
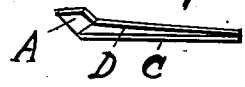
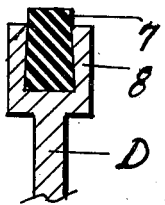
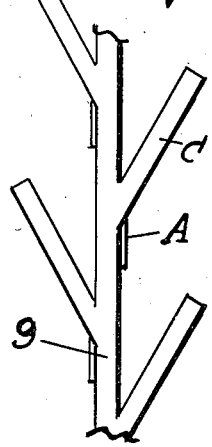
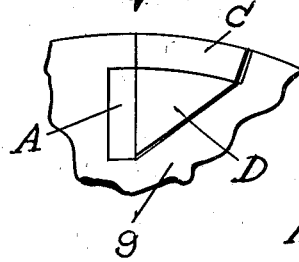
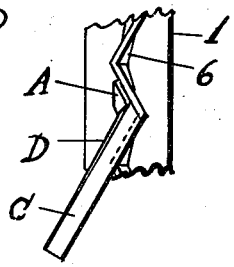
INVENTOR.
EARL O. HASKINS
BY U. G. Charles Patented Dec. 23, 1941

2,266,969

UNITED STATES PATENT OFFICE 2,266,969

TRACTOR WHEEL

Earl O. Haskins, Wichita, Kans.

Application October 25, 1940, Serial No. 362,755

2 Claims. (Cl. 301—43)

My invention relates to improvements in tractor wheels, and has for its principal object a wheel that will clean itself from accumulated dirt or mud-like substance at each consecutive revolution of the wheel.

A further object of my invention is to provide a disc wheel having efficient lugs for traction purpose, the lugs being secured in working relation to the periphery of the disc, whereby a usual make of rim for a wheel is eliminated.

A still further object of my invention is to provide a tractor wheel having lugs, the outward terminal ends of which will function as the periphery of the wheel, the ends of the lugs being positioned in such a way as to form a continuous bearing as the wheel rolls on a road bed, whereby vibration is eliminated, and also pulsative strokes.

A still further object of my invention is to provide a tractor wheel having a subdivided tread to avoid rolling a path-like track, packing the soil therealong that is prepared for seeding, as the tractor conveys a seed planting machine to and fro across the field.

A still further object of my invention is to provide on a tractory wheel a peripheral formation that will pass freely through loose soil, or mud, to encounter a solid bearing, whereby traction of the load is uninterrupted.

These and other objects will hereinafter be more fully explained, reference being had to the accompanying drawings, forming a part of this specification, and in which like characters will apply to like parts in the different views.

Referring to the drawings:

Fig. 3 is a sectional view on the diametrical axis line of the wheel, lugs omitted.

Fig. 4 is a fragmentary plan view of the wheel periphery, and one lug attached.

Fig. 5 is a side view of one of the lugs.

Fig. 6 is an edge view of Fig. 5.

Fig. 7 is a plan view of Fig. 5.

Fig. 8 is an inverted plan view of Fig. 7.

Fig. 9 is an enlarged modified fragmentary sectional view of the lug.

Fig. 10 is a modified fragmentary plan view of the tread of the wheel.

Fig. 11 is a fragmentary side view of Fig. 10.

The invention structurally consists of a wheel comprised of a body portion 1, disc-like in form and preferably of two members, each being concavo-convex, the concave sides confronting each other and being secured together peripherally by welding or otherwise, whereby the body is hollow, the body being axially bored to receive a shaft 3 secured against rotation by appropriate keys 4 or spleens, the hub having a clamp 5, one half of which is secured to the hub, the other half removable to clamp the shaft.

Figure 1:
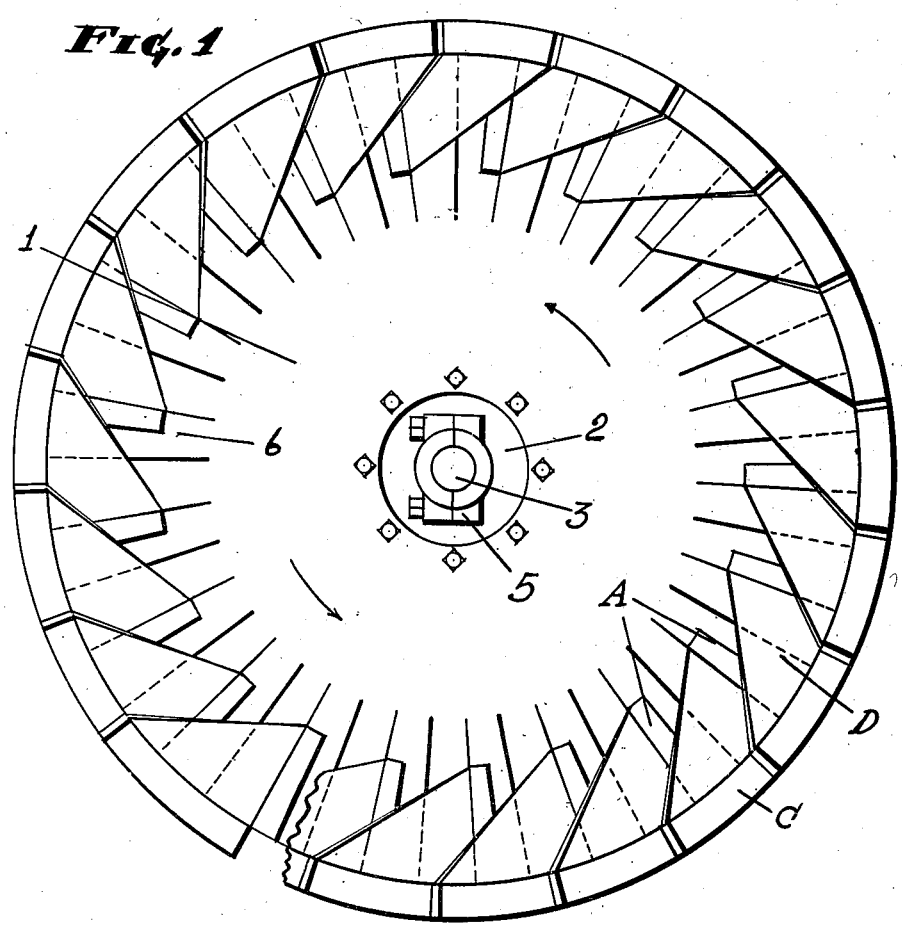
Fig. 1 is a side view of the tractor wheel.
Figure 2:
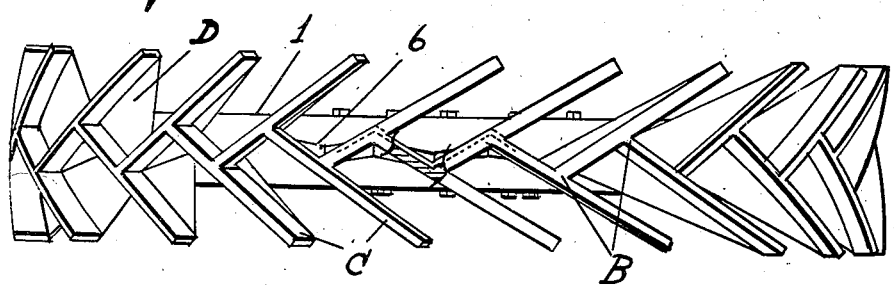
Fig. 2 is a plan view of the wheel.

Outwardly extending from the disc is an annular flange portion 6, said flange portion being crimped, the angles being in staggered relation, while the straight portions obliquely cross the center zone of the wheel and flange portion, whereby lugs are secured by welding to the straight portion of the crimp and being aligned therewith, except its marginal portion A that is bent to coincide with the adjacent reverse crimp as shown in Fig. 1, by which means, the angle of each crimp is reinforced, the said lugs being oppositely positioned on the straight portions of the crimp, whereby the lugs will interlap and be secured together where the end or inner edge of one lug will abut the side of another lug as at B, and so on in consecutive order around the wheel as illustrated in Fig. 2.

The outer or tread end of each lug is reinforced by increasing the thickness thereof as at C to afford a greater areal contact for traction. It will be seen that the edge portion D of each lug converges toward the inner extremity of the flange where it meets the convexity of the wheel, but terminating a short distance outward, as shown in Fig. 1; the lugs being so positioned and spaced apart is means to avoid skidding and acquire a firm grip for traction, and soil accumulating between the lugs is free to pass therebetween and outward during rotation of the wheel, and more particularly when the lugs reach an inverted position, and furthermore the periphery of the wheel being thus formed with respect to spacing of the lugs apart is means to pass through a loose condition of the ground surface to a solid texture for a firm grip during traction; the angle of the lugs being outward and rearward with respect to a forward line of travel is means to expand the earth from the center zone of the wheel should the wheel be inclined to slip in its traction movement with its load. The expansion would be a greater resistance than a contraction that would occur if the lugs were reversed. In other words, the expansion referred to tends to move the earth outward from the sides of the wheel while contraction would shear the earth within the scope of the lug extension, which would be a comparatively small resistance to that of the other.

The tread portion of each lug as interlapped is means to avoid vibration as a succeeding lug is in contact with the road bed prior to the other lug's disengagement from the bed as the wheel rolls therealong, whereby pulsative strokes are eliminated, and furthermore the tread thus formed is not inclined to fracture hard surface roads as the usual spaced lugs on the rim would impose.

In Fig. 9 is shown a modification for the tread portion of the lugs, in which case, the tread is channeled to receive a rubber filler 7 inserted in the walls 8 of the channel and outwardly extending as a cushion for the tread of the wheel.

In Fig. 10 is illustrated another modification involving a straight flange rim 9 peripherally of the wheel, to which is secured a similar lug beveled to abut the sides of the flange, and being welded thereto, said lugs obliquely extending outward from each side of the flange and adapted to function in like manner to the lugs heretofore described, and such other modifications will be made as lie within the scope of the appended claims.

Having fully described my invention what I claim as new and desire to secure by Letters Patent is:

1. In lugs for a tractor wheel, the wheel comprising a disc and an annular flange surrounding the disc portion of the wheel at its center zone and being integrally joined thereto, the flange being crimped radially of the wheel, each lug having a body portion substantially right angled triangle in form, one side of the right angle having a lateral bend along a marginal portion of the body, the other side of the right angle along a marginal portion being of greater thickness than the body portion, the lugs being secured to their respective crimps of the flange to extend in alternate opposite directions.

2. In lugs for a disc wheel, the wheel comprising a disc and an annular flange surrounding the disc portion of the wheel at its center zone and being integrally joined thereto, the flange being crimped radially of the wheel, the lug having a body portion substantially a right angled triangle in form, one side of the right angle having a marginal-portion laterally extending from one side of the body to seat on the side of the flanged portion of the wheel and being secured thereto, the other side of the right angle along a marginal portion having a channel formed therein, and a rubber filler positioned in the channel as a cushion for the tread of the wheel.

EARL O. HASKINS.